United States Patent [19]

Hanaoka

[11] Patent Number: 4,561,796
[45] Date of Patent: Dec. 31, 1985

[54] TAMPERPROOF CLAMPING CONSTRUCTION WITH BLOCK WEDGED IN SLOT

[75] Inventor: Masanori Hanaoka, Toyota, Japan

[73] Assignee: Toyota Jidosha Kabushiki Kaisha, Toyota, Japan

[21] Appl. No.: 277,386

[22] Filed: Jun. 25, 1981

[30] Foreign Application Priority Data

Nov. 10, 1980 [JP] Japan .............................. 55-158754

[51] Int. Cl.$^4$ .............................. F16D 1/00; F02P 7/02
[52] U.S. Cl. ........................................ 403/4; 403/116; 403/337; 123/146.5 A
[58] Field of Search .................... 403/4, 408, 98, 116, 403/409, 337; 123/146.5 A; 411/531, 546

[56] References Cited

U.S. PATENT DOCUMENTS

| | | | |
|---|---|---|---|
| 2,862,040 | 11/1958 | Curran | 411/531 X |
| 3,008,368 | 11/1961 | Hammitt et al. | 411/546 X |
| 3,878,432 | 4/1975 | Skalski | 123/146.5 A |
| 4,021,991 | 5/1977 | Hotz | 403/409 X |
| 4,383,505 | 5/1983 | Hanaoka et al. | 123/146.5 A |

Primary Examiner—Andrew V. Kundrat
Attorney, Agent, or Firm—Stevens, Davis, Miller & Mosher

[57] ABSTRACT

A construction for clamping together a first member and a second member. The first member is formed with a bolt hole, and is in contact with the second member which is formed with an elongated slot. The shank portion of a bolt passes through the elongated slot and into the bolt hole to engage with the first member. A block member lying within the elongated slot is formed with a hole through which the shank portion of the bolt passes. The head of the bolt presses the block member into the slot, towards the first member. The side walls of the block member are in contact with the side walls of the slot. At least one of the side walls of the block member or of the slot angles inwards, and the block member is so thick in the direction across the slot that without deformation of the parts the block member cannot be pulled by the bolt so far through the slot towards the first member as to contact the first member. Accordingly by the tightening up of the bolt the block member is wedged into the slot, and thus the relative positions of the first member and the second member are fixed and they are clamped together.

13 Claims, 8 Drawing Figures

TAMPERPROOF CLAMPING CONSTRUCTION WITH BLOCK WEDGED IN SLOT

BACKGROUND OF THE INVENTION

The present invention relates to a clamping construction, and, more particularly, relates to a clamping construction adapted for clamping together two members in any one of a range of relative positions, which is easily adjusted and then clamped up initially, but which thereafter is difficult but not impossible to readjust with regard to the mutual fixing positions of the two members, thus inhibiting tampering while not preventing necessary repositioning.

The clamping construction according to the present invention is suitable for application to a wide range of circumstances in which it is required to clamp together two members in any one of a range of relative positions in such a way that their relative position can with some difficulty be adjusted later, but the particular inspiration for the present invention has come from the problem of finding a way to clamp an internal combustion engine distributor to the body of the internal combustion engine, i.e. to fix the rotational position of the distributor around the central axis thereof with respect to the internal combustion engine; and, accordingly, the clamping construction according to the present invention will be explained in terms of the fixing of the angular position of a distributor, although the clamping construction according to the present invention is capable of much more general application to a wide variety of circumstances and machines.

Generally, the distributor of an internal combustion engine is constructed with a body which is generally of a form substantially cylindrically symmetrical about the central rotational axis of the distributor shaft thereof. The distributor shaft conventionally bears at its end a rotary contact member such as a rotor arm, which distributes high tension electricity produced by the distributor to the various sparking plugs of the internal combustion engine, and which also bears at an intermediate point along its length a contact breaker points actuation cam, various seal washers and/or oiling washers, etc.. When the contact breaker actuation cam advances past a certain rotational angle with respect to the body of the distributor, then the distributor provides a sudden alteration of the electric current passing through a coil of the internal combustion engine, and this coil then produces a high tension electrical pulse which is transmitted to a particular one of the spark plugs of the engine, to spark said particular spark plug. Accordingly, since the central shaft of the distributor is rotationally coupled to the crankshaft of the internal combustion engine, and thus its rotational position is fixedly determined with respect to the rotational position of the crankshaft of the internal combustion engine, therefore the point in the crank angle diagram at which the spark is produced is determined by the rotational fixing position of the distributor body to the body of the internal combustion engine. In other words, in order to obtain a desired ignition timing, it is required to fix the distributor body positively with respect to the internal combustion engine at a prescribed fixing angle.

A general form of prior art construction has been for the lower part of the distributor, close to the central shaft thereof which protrudes into the engine so as to be rotationally coupled with the camshaft or the like thereof, to be formed as a tapered conical point which is closely engaged into a corresponding tapered conical hole formed in the body of the internal combustion engine. Accordingly, the distributor body has been fixed with respect to the internal combustion engine, except that said distributor body may be rotated around the central axis of the distributor shaft thereof. Further, there has been constructed a flange member projecting from the side of the distributor body sideways in a plane perpendicular to the central axis of the distributor. This flange member has been pierced with an elongated slot which has extended in an arc shaped form around a center which is the point on said central axis of the distributor where said central axis is intersected by said plane. This elongated slot has been in close proximity to a part of the outer wall of the internal combustion engine, and in this part of the outer wall of the internal combustion engine there has been formed a bolt hole with a female screw thread formed on the inner circumferential defining wall thereof. A bolt has been passed through this elongated slot, with the head of said bolt on the side of the flange member remote from the wall of the internal combustion engine, and with a male screw thread on the shank portion of said bolt engaged with the aforesaid bolt hole. In a variation of this prior art construction, the bolt has been engaged, not directly with the internal combustion engine outer wall, but with a fixing member which has been fixed to the internal combustion engine outer wall.

According to such a construction, when the bolt is somewhat slackened with respect to the member into which it is fixed, then the distributor may be rotated around its central axis fairly freely, the aforesaid conical tapering portion formed on the distributor body around the central shaft thereof sliding fairly freely in the aforesaid conical tapered hole formed in the body of the internal combustion engine; and at this time the head of the bolt slides along the side of the flange member remote from the wall of the internal combustion engine, and does not tightly grip the flange member. Accordingly, the distributor may be rotated so far in the one rotational direction and in the other for the bolt to reach the respective extreme ends of the circumferential slot in the flange member.

On the other hand, when it is desired to clamp the fixing angle of the distributor with respect to the body of the internal combustion engine, so as to fix the ignition timing of the internal combustion engine, then it is only necessary to tighten up the bolt, driving it into the member such as the wall of the internal combustion engine to which it is threaded, and when this is done the head of the bolt, possibly via an intermediate washer, bears tightly on the side of the flange member remote from the wall of the internal combustion engine, and presses the flange member generally against the wall of the internal combustion engine. Thus, by the friction between the flange member and the head of the bolt or the washer interposed therebetween, and also by the friction of the flange member directly against the member such as the wall of the internal combustion engine to which the bolt is fitted, and against which said flange member is pressed by the tension of the bolt, the distributor is positively prevented from rotating about its central axis, thus fixing the ignition timing of the internal combustion engine.

However, a disadvantage of this prior art construction is that it is too easy to adjust. In more detail, it is of course essential for the fixing angle of the distributor with respect to the wall of the internal combustion engine to be adjustable at the factory, when the internal combustion engine is being assembled, in order for an appropriate ignition timing for the engine to be set, because it is impossible to manufacture the parts of the internal combustion engine and of the distributor so accurately as to dispense with initial adjustment of the ignition timing. Thus, initially, adjustability of the fixing angle of the distributor with respect to the internal combustion engine must be easy, simple, and sure. On the other hand, once the vehicle has been passed out from the factory and has been sold to a user, it is not desirable that it should be very easy to change the fixing angle of the distributor with respect to the internal combustion engine, and thus to alter the ignition timing.

This is because there are many vehicle users who are inclined to tamper with the timing of the internal combustion engine, by altering the fixing angle of the distributor with respect to the wall thereof, either under a mistaken impression that by doing so they are setting the ignition timing back to the true or correct ignition timing, or through a surreptitious desire to alter the performance characteristics of the internal combustion engine, such as for instance in order to generate more power therefrom, or in order to fit unauthorized ignition modifications. In this case, there is a strong possibility that this alteration of the ignition timing of the internal combustion engine by altering the fixing angle of the distributor to the side wall thereof may cause the density of harmful components in the exhaust gases emitted by the internal combustion engine to be increased. This is because of the sensitivity of various systems for controlling the density of harmful components in the exhaust gases of an internal combustion engine to the ignition timing of that internal combustion engine, and is becoming more and more a fact of the automobile art nowadays.

Thus, it is desirable that it should be quite difficult to change the fixing angle of the distributor with respect to the outer wall of the internal combustion engine, once the vehicle has been delivered from the factory. The above outlined form of construction for fixing the angle of the distributor with respect to the outer wall of the internal combustion engine fails to meet this criterion; in fact, at all times, it is very easy to alter the fixing angle of the distributor with respect to the outer wall of the engine, and thereby to alter the ignition timing; this can be done easily, both initially at the factory, later by an unauthorized mechanic working on the internal combustion engine, and also by an authorized workplace which is performing authorized service operations. In this connection, it should be noted that, even after the vehicle has been delivered from the factory, it is required that it should be possible, although preferably not very easy, for the fixing angle of the distributor with respect to the outer wall of the engine, and thereby the ignition timing, to be altered. This is because the characteristics of various of the parts of the distributor and of the internal combustion engine, such as the profile of the ignition cam thereof, and the state of wear of the ignition contact breaker points thereof, etc., may change over a long period of service use of the vehicle incorporating the engine. Accordingly, it is sometimes necessary for the fixing angle of the distributor with respect to the outer wall of the internal combustion engine to be altered, in order to maintain the same desired proper ignition timing as was set at the factory. This operation of setting the ignition timing can in principle be simply and easily performed by an appropriately equipped workplace by altering the fixing angle of the distributor with respect to the engine, and accordingly it is desirable that this alteration of the fixing angle of the distributor with respect to the outer wall of the internal combustion engine should be possible to be performed at an authorized workplace.

The above proposed construction for the fixing of the aforesaid flange member with respect to the outer wall of the internal combustion engine suffers from the defect that it is too easy to adjust. In other words, merely by slackening the fixing bolt, any person of even low mechanical skill can then twist the distributor with respect to the outer wall of the internal combustion engine, can thereby alter its fixing position with respect thereto, and accordingly can alter the ignition timing of the internal combustion engine. This is becoming more and more of a problem nowadays, with respect to the sensitivity of systems for removing harmful components from the exhaust gases of the engine, and it is very desirable that some means should be found for overcoming this problem of easy tampering.

A solution which has been proposed as a construction for fixing the fixing angle of a distributor with respect to the outer wall of an internal combustion engine has been for the aperture in the above described flange member to be formed not as an elongated slot, but on the contrary as a cylindrical bolt hole of approximately the same size as the aforesaid fixing bolt. Thus, when the bolt has been passed through the bolt hole in the aforesaid flange and has been screwed into the bolt hole in the fixing member such as the wall of the internal combustion engine, it is completely impossible for the fixing angle of the distributor with respect to the body of the internal combustion engine to be in any way altered. In this case, of course tampering is rendered quite impossible; but in fact it is impracticable under normal mass production conditions for the parts of the internal combustion engine and of the distributor thereof to be constructed so accurately and so free from the effects of manufacturing tolerances that the timing of the internal combustion engine can be accurately and properly preset in such a built in way. Accordingly, it becomes impossible to obtain proper ignition timing for such an internal combustion engine, and accordingly this solution is not practicable. In fact, even if it were possible initially to attain the correct ignition timing for such an internal combustion engine at the factory, then, according to this construction, even in an authorized workplace such as a garage it would be impossible to adjust the fixing angle of the distributor with respect to the wall of the internal combustion engine, in order to compensate for slight changes in the parts of the distributor and of the internal combustion engine, so as to return the ignition timing of the internal combustion engine to the proper ignition timing, after the ignition timing setting has wandered slightly from the proper ignition timing setting. Thus, in summary, this has proved to be not a practicable solution to the problem of tampering.

SUMMARY OF THE INVENTION

Accordingly, it is an object of the present invention to provide a clamping construction, suitable for clamping the fixing angle of a distributor with respect to the body of an internal combustion engine, in which, before the clamping construction is first clamped up, the relative positions of the distributor and of the internal combustion engine may be substantially freely and easily adjusted.

It is a further object of the present invention to provide a clamping construction, suitable for clamping the fixing angle of a distributor with respect to the body of an internal combustion engine, in which, after the first clamping up of the clamping construction, further adjustment of the fixing angle of the distributor with respect to the internal combustion engine, in order to adjust the ignition timing of the internal combustion engine, is difficult.

It is a further object of the present invention to provide a clamping construction, suitable for clamping the fixing angle of a distributor with respect to the body of an internal combustion engine, in which, after the first clamping up of the clamping construction, further unclamping of the clamping construction, so as further to alter the fixing angle of the distributor with respect to the engine so as further to alter or reset the ignition timing of the engine, is not impossible, especially if the operator is provided with appropriate tools.

It is a further object of the present invention to provide a clamping construction, suitable for clamping the fixing angle of a distributor with respect to the body of an internal combustion engine, in which tampering with the fixing angle of the distributor to the outer wall of the internal combustion engine is made difficult for an inexperienced or unauthorized mechanic.

It is a yet further object of the present invention to provide a clamping construction, suitable for clamping the fixing angle of a distributor with respect to the body of an internal combustion engine, in which a block member is incorporated which is wedgingly engaged into an elongated slot formed in a flange member extending from the body of the distributor in a plane perpendicular to the central axis thereof.

It is a yet further object of the present invention to provide a clamping construction, suitable for clamping the fixing angle of a distributor with respect to the body of an internal combustion engine, in which one of the above described block member and flange member is formed of a harder substance and the other is formed of a softer substance, and in which the harder of these two members is formed with serrations thereon which are adapted to dig into the softer of these two members so as to promote the above described wedging engagement therebetween.

It is a yet further object of the present invention to provide a clamping construction which can be applied to a wide range of various mechanical constructions in which the various above desired properties are required, and which will not be limited merely to use for clamping the fixing angle of a distributor to an internal combustion engine.

According to the present invention, these and other objects are attained by a construction for clamping together: (a) a first member, formed with a first contact surface to which opens a cylindrical bolt hole formed in said first member, and (b) a second member formed with a second contact surface generally of cooperating form to said first contact surface on said first member, said second member also being formed with an elongated slot which is defined by two opposing inner side walls extending along its length, said elongated slot extending generally in a direction along said second contact surface, and said elongated slot opening from said second contact surface to the side of said second member remote from said second contact surface; (c) contact together of said first member and of said second member being possible in any one of a range of relative positions, with said first contact surface of said first member opposing and contacting said second contact surface of said second member and with the open end of said bolt hole opposing said elongated slot, comprising: (d) a bolt-nut assembly comprising a shank portion and at least one nut, said shank portion of said bolt passing through said elongated slot, said shank portion of said bolt-nut assembly being closely engaged with the cylindrical defining wall of said bolt hole in said first member, and said shank portion of said bolt-nut assembly being engaged with said first member so that the tightening up of said bolt-nut assembly tensions said bolt and urges said first member along the direction of the central axis of said bolt-nut assembly in the direction of said second member; and (e) a block member, located at least partly within said elongated slot, formed with a cylindrical through hole through which said shank portion of said bolt-nut assembly passes, and with the cylindrical defining wall of which said shank portion of said bolt-nut assembly is closely engaged, said bolt-nut assembly exerting pressure on a part of said block member remote from said first member so as to urge said block member along the direction of the central axis of said bolt-nut assembly in the direction towards said first member, said block member being formed with two outer side walls and being positioned with respect to said elongated slot so that said two outer side walls extend generally along the length of said elongated slot, each of said two outer side walls opposing and being in contact with a corresponding inner side wall of said elongated slot; (f) at least one of said four side walls being inclined with respect to said central axis of said bolt-nut assembly, so that the part of said inclined side wall which is closer to said first member is closer to said central axis of said bolt-nut assembly than is the part of said inclined side wall which is further from said first member; (g) the thickness and the profile of said block member in the section across said elongated slot, and the width and the profile of said elongated slot in the section across said elongated slot, being such that without deformation of said block member or of said second member it is not possible to displace said block member through said elongated slot along the direction of said central axis of said bolt-nut assembly in the direction towards said first member so far as to allow said block member to come into contact with said first member; (h) the tightening up of said bolt-nut assembly wedgingly urging said block member in the direction of said first member and into said elongated slot and forcing said two outer side walls of said block member each against its corresponding inner side wall of said elongated slot; (i) whereby, when said bolt-nut assembly is tightened up, said second member is urged against said first member with said second contact surface of said second member generally in contact with said first contact surface of said first member; and the engagement of said two outer side walls of said block member against their corresponding inner side walls of said elongated slot, the engagement of said shank of said bolt-nut assembly with said cylindrical defining wall of said cylindrical through hole in said block member, and the engagement of said shank of said bolt-nut assembly with the cylindrical defining wall of said bolt hole in said first member, fixing said second member with respect to said first member, so that said second contact surface is prevented from sliding upon said first contact surface.

According to such a construction, before the bolt has ever been tightened up, the relative rotational positions of the first member and of the second member, which, conveniently, may be respectively the body of an internal combustion engine and a flange projecting from the body of the distributor thereof, may be freely adjusted without much difficulty; but, on the other hand, after the aforesaid bolt has been tightened up, then it is virtually impossible to move the first member and the second member with respect to one another, because the tension of the bolt forces the block member into the slot in a wedging fashion, so that the friction between the sides of the block member and the sides of the elongated slot becomes very high, and accordingly the second member is clamped, via the sides of the elongated slot, via the block member, via the sides of the cylindrical hole in the block member, via the shank portion of the bolt, and via the sides of the bolt hole in the first member, to the first member. Further, even if subsequently the bolt is somewhat slackened off, it is still not easy to move the second member such as the flange projecting from the body of the distributor with respect to the first member such as the body of the internal combustion engine, because the block member still remains as wedged into the elongated slot, and in order to free the block member from the sides of the elongated slot it is necessary to lever the block member upwards or to displace it out of the slot in some fashion, which is not easy unless one is provided with the right tools for doing this job.

Accordingly, although it is not impossible to adjust the fixing position of the second member with respect to the first member, after first the bolt has been once tightened up, it is difficult to do so, especially if one is not provided with appropriate tools for the work, or if one is inexperienced, or unfamiliar with the technical details of the clamping construction. Thus, a construction is provided for fixing a first member and a second member together with regard to their relative positions, which is difficult to be tampered with by an unauthorized or inexperienced mechanic, or one who has not got the correct tools, due to the provision of the aforesaid block member which is wedged into the elongated slot.

For this, it is important that the action of moving the block member into the elongated slot should be a wedging action, in other words, firstly, that either the elongated slot should become narrower in its portion towards the first member, or that the block member should become thicker in its portion away from the first member, or both; and, secondly, that the thickness and the profiles of the block member, and of the slot, in their sections generally perpendicular to the length of the elongated slot, should be such that, when the block member is forced into the elongated slot by the tensioning up of the bolt, interference of the side walls of the block member with the side walls of the elongated slot should occur, and a wedging effect should be provided, before the block member has been moved so far towards the first member as to come into contact with the first member. This is in order that the strain of the tension of the bolt should be taken between the side walls of the block member and the side walls of the elongated slot, and not by the side of the block member closest to the first member being pressed directly against the first member without any substantial pressure being taken by the side walls of the block member which contact the side walls of the elongated slot.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENTS

The present invention will now be particularly described in terms of a series of six preferred embodiments thereof, and with reference to the accompanying drawings.

Figure 1:
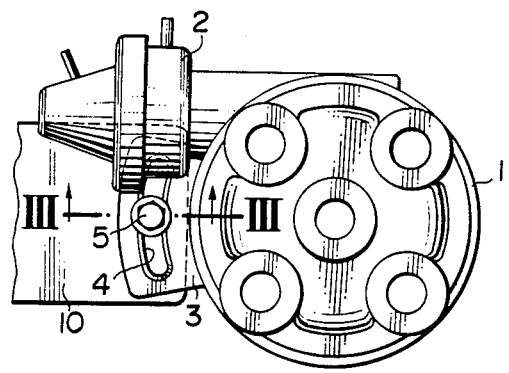
FIG. 1 is a plan view of a first preferred embodiment of the clamping construction according to the present invention, said clamping construction being applied to the clamping of the fixing angle of a distributor with respect to the body of an internal combustion engine, and showing, in addition to the clamping construction, the distributor cap of the distributor, a vacuum advance mechanism for the distributor, and part of said engine body.

In FIG. 1, there is shown in plan view a first preferred embodiment of the clamping construction according to the present invention. In this figure, the reference numeral 1 denotes a distributor with a body or casing within which are provided, although it is not so shown in the drawings, a central axially extending distributor shaft, a contact breaker point system operated by this distributor shaft, and so on. Further, to the body of the distributor 1 there is fixed a vacuum ignition timing advance device 2.

On the outer part of the body of the distributor 1 there is fixed a leaf shaped or tongue shaped flange 3, which projects from the body of the distributor 1 in a plane perpendicular to the central axis thereof. This flange member 3 is pierced from its upper side, as seen in FIG. 1, to its lower side by an elongated arc shaped slot 4, which extends in a circular arc whose center is a point on the central axis of the distributor 1. A bolt 5 is passed through the elongated slot 4 in the direction perpendicular to the plane of the drawing paper in FIG. 1, and the end of said bolt 5 remote from its head end is screwed into a part of the outer wall surface of the internal combustion engine to which the distributor 1 is fitted, said part being designated by the reference numeral 10.

Figure 2:
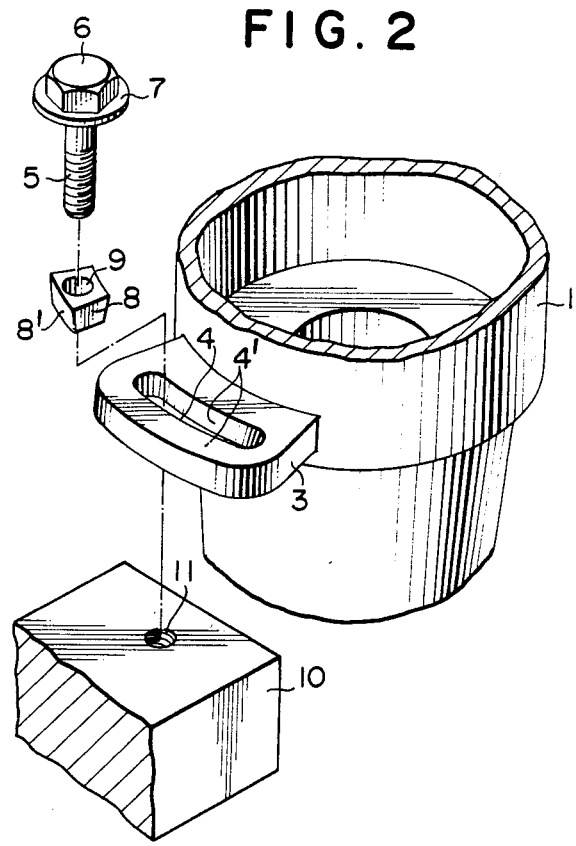
FIG. 2 is an exploded perspective view of the clamping construction according to the first embodiment of the present invention shown in FIG. 1, and also showing part of the body of the distributor and part of the body of the internal combustion engine; in this first preferred embodiment, the side walls, both of a block member and of an elongated slot, are inclined with respect to the central axis of a bolt, and this bolt is screwed directly into the body of the internal combustion engine.
Figure 3:
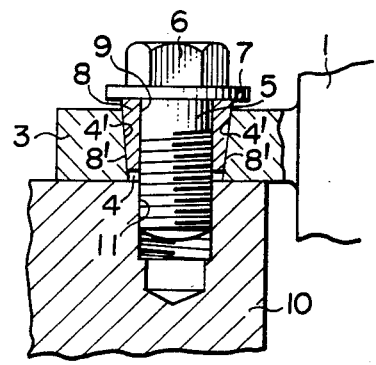
FIG. 3 is a sectional view through the first preferred embodiment of the clamping construction according to the present invention shown in FIGS. 1 and 2, taken along a plane shown by the lines III—III in FIG. 1, and showing a bolt thereof in side view.

In FIG. 2, an exploded perspective view of these various parts is shown, and in FIG. 3 a sectional view is shown taken along the plane shown by the lines III—III in FIG. 1. Here it may be seen that the bolt 5 is provided at its upper end in FIGS. 2 and 3 with a head portion 6, and with a flange portion 7 adjacent to said head portion 6, and the shank portion of this bolt 5, where it passes through the elongated slot 4, passes through a cylindrical hole 9 which is formed through a block member 8 which is generally located within the elongated slot 4. The sides of the cylindrical hole 9 closely cooperate with the shank portion of the bolt 5. The lower end of the shank portion of the bolt 5 is formed with a male screw thread thereon, and this male screw thread is engaged with a female screw thread formed on the inside of a bolt hole 11 which is formed in the above mentioned outer wall surface 10 of the internal combustion engine.

Particularly according to the present invention, the outer side walls 8' of the block member 8 are in contact with the inner side walls 4' of the elongated slot 4. Further, in this first preferred embodiment of the clamping construction according to the present invention, both of the two outer side walls 8' of the block member 8, as well as both of the inner side walls 4' of the elongated slot 4, are inclined with respect to the central axis of the bolt 5, and incline inwards towards this central axis, so that their parts which are closer to the body 10 of the internal combustion engine are closer to said central axis of said bolt 5, than are their parts which are more remote from the body 10 of the internal combustion engine. This construction is best seen in FIG. 3.

In fact, in more detail, the outer side walls 8' of the block member 8 are in fact not formed as planes, but are actually formed as parts of the surfaces of cones, i.e. are slightly curved in order to follow the curved arcuate form of the inner side walls 4' of the elongted slot 4. However, this slight curving of the outer side walls 8' of the block member 8 is only apparent in the second approximation, and is strictly speaking irrelevant to the construction and function of the clamping construction according to the present invention, and therefore will be henceforward ignored in this specification and in the claims appended thereto.

The dimensions of the various parts, as may be best seen in FIG. 3, are such that, when the bolt 5 is tightened up, and as said bolt 5 wedgingly forces the block member 8 into the elongated slot 4, the outer side walls 8' of the block member 8 come into wedging engagement with the inner side walls 4' of the elongated slot 4, before either the block member 8 has moved so far towards the wall 10 of the internal combustion engine that its bottom part in FIG. 3 should come into contact with said wall 10, and also before the upper part of the block member 8 has entered so far into the elongated slot 4 that the flange member 7 formed adjacent to the hexagonal head 6 of the bolt 5 should come into contact with the upper face in FIG. 3 of the flange member 3. Accordingly, the entire tensile force exerted by the bolt 5 at this time is transmitted through the block member 8 to exert pressure between the outer side walls 8' of the block member 8 and the inner side walls 4' of the elongated slot 4. That is to say, none of this tensile force of the bolt 5 is absorbed, either by pressure of the block member 8 directly upon the wall 10 of the internal combustion engine, or by pressure of the flange portion 7 near the head 6 of the bolt 5 against the upper face in FIG. 3 of the flange member 3.

The clamping construction described above according to the first preferred embodiment of the clamping construction according to the present invention functions as follows.

Before the bolt 5 is first tightened up into the bolt hole 11 formed in the wall 10 of the internal combustion engine, i.e. at the factory where the internal combustion engine and the distributor 1 are being assembled together, then the block member 8 has never been wedged into the elongated slot 4, and accordingly the outer side walls 8' of the block member 8 can freely slide along and past the inner side walls 4' of the elongated slot 4. In this condition, it is freely and easily possible to turn the body of the distributor 1 around its central axis, so as to adjust thereby the fixing angle of the distributor 1 with respect to the body 10 of the internal combustion engine, and thus to adjust the ignition timing of the internal combustion engine; and during this turning the bolt 5 moves to and fro within the limits of the elongated slot 4, said elongated slot 4 being constructed to be of ample length to allow for all desired possibilities for setting of the ignition timing of the internal combustion engine, and to allow for all possible variations of the sizes and configurations of the various parts of the internal combustion engine and of the distributor 1 within the limits of the manufacturing tolerances currently being implemented in their manufacture.

When the correct ignition timing has been determined in a conventional manner such as by the use of a stroboscope or the like, then the bolt 5 is tightened up, and the flange portion 7 adjacent to the hexagonal head portion 6 thereof presses against the upper part in FIGS. 2 and 3 of the block member 8, so as to push this block member 8 down within and into the elongated slot 4. At this time, as explained above, the outer side walls 8' of the block member 8 engage against the inner side walls 4' of the elongated slot 4, before the lower portion in FIGS. 2 and 3 of the block member 8 can come into contact with the body 10 of the internal combustion engine, and before the flange portion 7 of the bolt 5 can come into contact with the upper part in FIG. 3 of the flange portion 3. Accordingly, by the further tightening up of the bolt 5, the block member 8 becomes firmly wedged into the elongated slot 4, both because of the tapering shape or inclined shape of the outer side walls 8' of the block member 8, and also because of the tapering or inclined shape of the inner side walls 4' of the elongated slot 4.

In fact, by the tapered shape or inclined shape as described above of the outer side walls 8' of the block member 8, and of the inner side walls 4' of the elongated slot 4, the pressure between these walls which is caused by the tension in the shank of the bolt 5 is greatly magnified, roughly proportionally to the cotangent of the angle which the slope of these inclined walls makes with the direction of the central axis of the bolt 5. Thus, the block member 8 becomes firmly fixed with respect to the inner side walls 4' of the elongated slot 4, i.e. with respect to the flange member 3. Accordingly, by the close cooperation of the shank portion of the bolt 5, both with respect to the internal side wall of the cylindrical hole 9 within the block member 8, and also with respect to the internal side wall of the bolt hole 11 formed within the wall 10 of the internal combustion engine, it becomes practically impossible for the flange member 3 to move with respect to said side wall 10 of the internal combustion engine. Further, by the tensile action of said bolt 5, said flange portion 3 is also directly clamped against the wall 10 of the internal combustion engine, and considerable friction is caused therebetween, which further prevents said flanged member 3 from moving with respect to said wall 10 of the internal combustion engine. Accordingly, it is in practice impossible at this stage for the fixing angle of the distributor 1 with respect to the internal combustion engine to alter, and thereby the ignition timing of the internal combustion engine is made to be fixed.

In the shown first preferred embodiment of the clamping construction according to the present invention, in fact, each of the outer side walls 8' of the block member 8 slopes at substantially the same angle to the central axis of the bolt, as does the corresponding inner side wall 4' of the elongated slot 4. Thus, close mutual contact between each of the side walls 8' of the block member 8, and its corresponding side wall 4' of the elongated slot 4, is available, over major portions of the surfaces of said outer side walls 8' of the block member 8, and also over major portions of the extent of the contact surfaces of said inner side walls 4' of the elongated slot 4 in the direction of the central axis of the bolt 5. This is particularly advantageous in order to improve frictional engagement between the block member 8 and the flange member 3.

Further, in the shown first preferred embodiment of the clamping construction according to the present invention, each of these two outer side walls 8' of the block member 8, as well as each of the inner side walls 4' of the elongated slot 4, in fact is inclined at substantially the same angle to said central axis of said bolt 5. This has a further useful effect, in that, as the block member 8 is wedgingly forced into the elongated slot 4, by the bolt 5 being tightened up and the head portion 6 of the bolt 5 exerting pressure on the upper side in FIG. 3 of the block member 8, no particular tendency is caused for the block member 8 to tilt within said elongated slot 4 about an axis perpendicular to the plane of the drawing paper in FIG. 3. If, on the other hand, the slope angles with respect to the central axis of the bolt 5 of the outer side walls 8' of the block member 8, and of the inner side walls 4' of the elongated slot 4, were not equal on the two sides of the block member 8, and the elongated slot 4, then some such undesirable tilting tendency might well occur.

The tamperproof nature of this clamping construction will now be explained. If an unauthorized mechanic such as a user of the automobile to which this tamperproof construction is provided should make an attempt to alter the ignition timing of the internal combustion engine, by altering the fixing angle of the distributor 1 with respect to the body 10 of the internal combustion engine, then he will commence to do so by loosening the bolt 5. However, at this time, the block member 8 will remain wedged within the elongated slot 4, and accordingly such an unauthorized person will find it difficult to turn the body of the distributor 1 about its central axis so as to alter the fixing position of the distributor 1 with respect to the body 10 of the internal combustion engine, and thus to alter the ignition timing of the internal combustion engine. Further, such an unauthorized person will find it hard to displace the block member 8 out of its wedged in position within the elongated slot 4, because he will probably not be provided with a suitable tool such as a pry bar to use for this work, because the nature of the operation itself is rather delicate and painstaking, and because such an unauthorized person will probably not know properly how to perform this prying removal. Accordingly, tampering with the clamping construction according to this first embodiment of the tamperproof construction according to the present invention is rather difficult.

This wedging of the block member 8 within the elongated slot 4 may be promoted if, in fact, the block member 8 is constructed to be of the same material as the flange member 3. This is because in such a case it may be envisaged that over a considerable period of time such as elapses during the use of an automobile the outer side walls 8' of the block member 8 may become frictionally welded to the inner side walls 4' of the elongated slot 4. In other words, the wedging in of the block member 8 within the elongated slot 4 may become tighter, due to this frictional welding. In this case, the fixing angle of the distributor 1 with respect to the body 10 of the internal combustion engine, and thereby the ignition timing of the internal combustion engine, even more definitely becomes difficult to be changed by a person performing unauthorized tampering.

On the other hand, if it is desired to alter the fixing angle of the distributor 1 with respect to the body 10 of the internal combustion engine—in other words it is desired to alter the ignition timing of the internal combustion engine—in a properly authorized workshop or garage or the like, which is provided with proper engineering tools and know how appropriate to the work in hand, then it will be possible for a mechanic in such a workplace to pry out the block member 8 from its wedged in position within the elongated slot 4, by the use of a suitable tool such as a lever, coupled with the use of the required know how.

Thus, it is not actually impossible for the fixing angle of the distributor 1 with respect to the body 10 of the internal combustion engine, i.e. for the ignition timing of the internal combustion engine, to be altered; it is merely made difficult, according to the present invention, in order to prevent unauthorized tampering. Of course, if it were quite impossible to alter the fixing angle of the distributor 1 with respect to the body 10 of the internal combustion engine, i.e. to alter the ignition timing of the internal combustion engine, then as explained above this would be a quite unacceptable state of affairs. However, the clamping construction according to the present invention as outlined above provides a proper degree of difficulty to the alteration of the fixing angle of the distributor 1 to the body 10 of the internal combustion engine, and of the ignition timing of the internal combustion engine, without making this alteration impossible.

Figure 4:
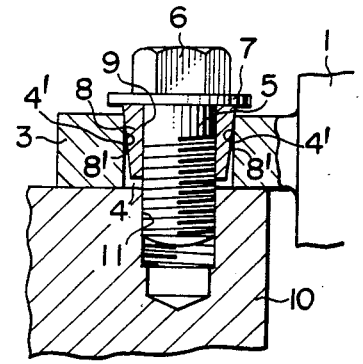
FIG. 4 is a sectional view, similar to FIG. 3, taken through a second preferred embodiment of the clamping construction according to the present invention, said second preferred embodiment being similar to the first preferred embodiment of the clamping construction according to the present invention shown in FIGS. 1, 2, and 3, except that the inner side walls of the elongated slot are not inclined, but extend substantially parallel to the central axis of the bolt, while the outer side walls of the block member are inclined with respect to said central axis of said bolt.

In FIG. 4, there is shown a sectional view, taken, in a fashion similar to FIG. 3, through a second preferred embodiment of the clamping construction according to the present invention. In FIG. 4, parts which correspond to parts of the first preferred embodiment shown in FIGS. 1, 2, and 3, and which have the same functions, are designated by the same reference letters and numerals as in those figures.

In this second preferred embodiment, the only difference from the first embodiment is that, whereas in the first preferred embodiment of the clamping construction according to the present invention shown in FIGS. 1-3 both of the outer side walls 8' of the block member 8 and both of the inner side walls 4' of the elongated slot 4 were inclined with respect to the central axis of the bolt 5, and were inclined inwards towards this central axis so that their parts which were closer to the body 10 of the internal combustion engine were closer to said central axis of said bolt 5 than were their parts which were more remote from the body 10 of the internal combustion engine, by contrast, in this second preferred embodiment of the clamping construction according to the present invention, only the outer side walls 8' of the block member 8 are sloped in this way, and the inner side walls 4' of the elongated slot 4 are not inclined, but on the contrary extend generally parallel to said central axis of said bolt 5 and are not substantially sloped with respect thereto, so that in fact these inner side walls 4' of the elongated slot 4 extend generally perpendicularly to the upper and the lower surfaces as seen in FIG. 4 of the flange member 3.

The operation, the features, and the clamping characteristics of this second preferred embodiment of the clamping construction according to the present invention are generally similar to those of the first embodiment shown in FIGS. 1-3. The inclination of only the outer side walls 8' of the block member 8, without the inner side walls 4' of the elongated slot 4 being inclined, is still sufficient to provide the above described wedging action of the block member 8 into the elongated slot 4, whereby, as the bolt 5 is tightened up and is driven into the wall 10 of the internal combustion engine, the block member 8 is wedgingly driven into the elongated slot 4 so as to wedge the outer side walls 8' of the block member 8 against the inner side walls 4' of the elongated slot 4.

It will be noted, however, that in this second preferred embodiment of the clamping construction according to the present invention the engagement between the outer side walls 8' of the block member 8 and the inner side walls 4' of the elongated slot 4 occurs primarily at the free side of the flange member 3, i.e. at the upper part as seen in FIG. 4 of the inner side walls 4' of the elongated slot 4. Further, this engagement is not, as was the engagement of the outer side walls 8' of the block member 8 against the inner side walls 4' of the elongated slot 4 in the first preferred embodiment of the clamping construction according to the present invention, as particularly shown in FIG. 3, an engagement along substantially a major part of the extent of the outer side walls 8' of the block member 8, and along substantially a major part of the vertical extent in FIG. 4 of the inner side walls 4' of the elongated slot 4, but instead is an engagement substantially along a thin line, especially before any deformation of the above mentioned parts. This has the advantage that the tightening up function of the clamping construction according to this second preferred embodiment of the clamping construction according to the present invention is more gradual, than was the case in the first preferred embodiment; and, in fact, as the bolt 5 is tightened up into the wall 10 of the internal combustion engine, the very high forces that will necessarily be thereby caused in this second preferred embodiment of the clamping construction according to the present invention, between the outer side walls 8' of the block member 8 and the inner side walls 4' of the elongated slot 4 at their line of contact, will more quickly deform the outer side walls 8' of the block member 8 and the inner side walls 4' of the elongated slot 4, and thus will ensure tight mutual engagement therebetween, than was the case in the first preferred embodiment shown in FIGS. 1-3.

Thus it is seen that the same advantages and functions are obtained with this second preferred embodiment of the clamping construction according to the present invention, as with the first preferred embodiment shown in FIGS. 1-3.

Figure 5:
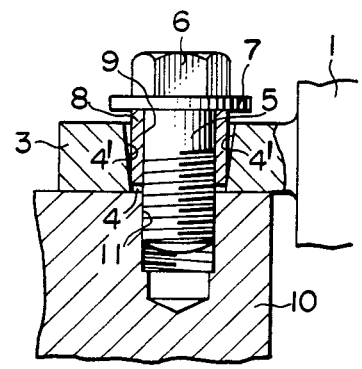
FIG. 5 is a sectional view, similar to FIGS. 3 and 4, taken through a clamping construction which is a third preferred embodiment of the clamping construction according to the present invention, said third preferred embodiment being similar to the first and second preferred embodiments of the clamping construction according to the present invention, shown respectively in FIGS. 1, 2, and 3, and in FIG. 4, except that in this third preferred embodiment the outer side walls of the block member extend substantially parallel to the central axis of the bolt, while the inner side walls of the elongated slot are inclined with respect to said central axis of said bolt.

In FIG. 5, there is shown a sectional view, taken, in a fashion similar to FIGS. 3 and 4, through a third preferred embodiment of the clamping construction according to the present invention. In FIG. 4, parts which correspond to parts of the first preferred embodiment shown in FIGS. 1, 2, and 3, and of the second preferred embodiment shown in FIG. 4, and which have the same functions, are designated by the same reference letters and numerals as in those figures.

In this third preferred embodiment of the clamping construction according to the present invention, the only difference from the first embodiment is that, whereas in the first preferred embodiment of the clamping construction according to the present invention shown in FIGS. 1-3 both of the outer side walls 8' of the block member 8 and both of the inner side walls 4' of the elongated slot 4 were inclined with respect to the central axis of the bolt 5, and were inclined inwards towards this central axis so that their parts which were closer to the body 10 of the internal combustion engine were closer to said central axis of said bolt 5 than were their parts which were more remote from the body 10 of the internal combustion engine, by contrast, in this second preferred embodiment of the clamping construction according to the present invention, only the inner side walls 4' of the elongated slot 4 are sloped in this way, and the outer side walls 8' of the block member 8 are not inclined, but, on the contrary, extend generally parallel to said central axis of said bolt 5 and are not substantially sloped with respect thereto, so that in fact these outer side walls 8' of the block member 8 extend generally perpendicularly to the upper and the lower surfaces as seen in FIG. 5 of the block member 8.

In this first preferred embodiment of the clamping construction according to the present invention, as in the second preferred embodiment of the clamping construction according to the present invention shown in FIG. 4, the operation, the features, and the clamping characteristics are generally similar to those of the first embodiment shown in FIGS. 1-3. The inclination of only the inner side walls 4' of the elongated slot 4, without the outer side walls 8' of the block member 8 being inclined, is still sufficient to provide the above described wedging action of the block member 8 into the elongated slot 4, whereby, as the bolt 5 is tightened up and is driven into the wall 10 of the internal combustion engine, the block member 8 is wedgingly driven into the elongated slot 4 so as to wedge the outer side walls 8' of the block member 8 against the inner side walls 4' of the elongated slot 4.

The engagement between the outer side walls 8' of the block member 8 and the inner side walls 4' of the elongated slot 4 is along thin linear portions of these members, and, as in the second preferred embodiment of the clamping construction according to the present invention, this has the advantage that the tightening up function of the clamping construction according to this third preferred embodiment of the clamping construction according to the present invention is more gradual, than was the case in the first preferred embodiment shown in FIGS. 1-3; and, in fact, as the bolt 5 is tightened up into the wall 10 of the internal combustion engine, the very high forces that will necessarily be thereby caused, in this third preferred embodiment of the clamping construction according to the present invention, between the outer side walls 8' of the block member 8 and the inner side walls 4' of the elongated slot 4 at their line of contact, will more quickly deform the outer side walls 8' of the block member 8 and the inner side walls 4' of the elongated slot 4, and thus will ensure tight mutual engagement therebetween, than was the case in the first preferred embodiment shown in FIGS. 1-3.

However, in contradistinction to what was the case in the second preferred embodiment of the clamping construction according to the present invention shown in FIG. 4, this thin line of mutual engagement between the outer side walls 8' of the block member 8 and the inner side walls 4' of the elongated slot 4, in this third preferred embodiment, occurs, not at the upper free side as seen in FIG. 5 of the flange member 3, but instead as a part of the inner side walls 4' of the elongated slot 4 near but not at the bottom side of the flange member 3 as seen in FIG. 5, i.e. near but not at the surface of contact between the flange member 3 and the body 10 of the internal combustion engine. This has a particular meaning with regard to the transmission of force between this contact part between the outer side walls 8' of the block member 8 and the inner side walls 4' of the elongated slot 4, i.e. between the block member 8 and the flange member 3; and, in particular, because the bottom face in FIG. 5 of the flange member 3 is close to this contact part between the outer side walls 8' of the block member 8 and the inner side walls 4' of the elongated slot 4, thereby undesirable leverage is avoided between the block member 8 and the flange member 3, i.e. twisting of the bolt 5 about an axis perpendicular to its long axis is minimized, and thereby a more satisfactory functioning of the clamping construction according to this third preferred embodiment of the clamping construction according to the present invention is obtained.

Thus it is seen that the same advantages and functions are obtained with this third preferred embodiment of the clamping construction according to the present invention also, as with the other two preferred embodiments already described and shown in FIGS. 1-4.

Figure 6:
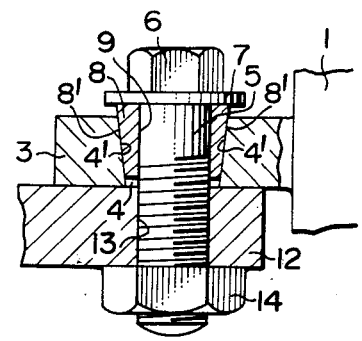
FIG. 6 is a sectional view, similar to FIGS. 3, 4, and 5, taken through a clamping construction which is a fourth preferred embodiment of the clamping construction according to the present invention, and which is similar to the first through third preferred embodiments of the clamping construction according to the present invention shown in FIGS. 1-5, and which is particularly, with respect to the sloping of the inner walls of the elongated slot and of the outer walls of the block member, similar to the first preferred embodiment shown in FIGS. 1-3, except that the lower threaded part of the shank of the bolt is not threadingly engaged with the sides of the cylindrical hole in the part of the body of the internal combustion engine to which said bolt is coupled, but instead passes through this hole and is threadingly engaged with a nut fitted on the other side of said part of said body of the internal combustion engine.

In FIG. 6, there is shown a sectional view, taken, in a fashion similar to FIGS. 3, 4, and 5, through a fourth preferred embodiment of the clamping construction according to the present invention. In FIG. 5, parts which correspond to parts of the first preferred embodiment shown in FIGS. 1, 2, and 3, of the second preferred embodiment shown in FIG. 4, and of the third preferred embodiment shown in FIG. 5, and which have the same functions, are designated by the same reference letters and numerals as in those figures.

In this fourth preferred embodiment of the clamping construction according to the present invention, the inclinations of the outer side walls 8' of the block member 8 and of the inner side walls 4' of the elongated slots 4 are the same as in the first preferred embodiment of the clamping construction according to the present invention shown in FIGS. 1-3. In more detail, as in the first preferred embodiment of the clamping construction according to the present invention shown in FIGS. 1-3, both of the outer side walls 8' of the block member 8 and both of the inner side walls 4' of the elongated slot 4 are inclined with respect to the central axis of the bolt 5, and are inclined inwards towards this central axis so that their parts which are further from the hexagonal head portion 6 of the bolt 5 are closer to said central axis of said bolt 5 than are their parts which are closer to said hexagonal head 6 of said bolt 5.

However, in this fourth preferred embodiment of the clamping construction according to the present invention, the threaded part of the shank portion of the bolt 5 is not directly threadingly engaged with the wall 10 of the internal combustion engine. On the contrary, a plate shaped flange member 12 is rigidly connected to the wall 10 of the internal combustion engine (which is not shown in FIG. 6), and in this second flange member 12 a cylindrical through hole 13 is formed, the one end of this cylindrical through hole 13 opposing the elongated slot 4. The shank portion of the bolt 5 passes all the way through this cylindrical hole 13, and projects out from the other free side of the second flange member 12 remote from the first flange member 3. On this protruding portion of the shank portion of the bolt 5 there is threadingly fitted a nut 14.

Accordingly, before the clamping construction according to this fourth preferred embodiment of the clamping construction according to he present invention is first tightened up, then the nut 14 will be loose on the shank portion of the bolt 5, and accordingly the block member 8 will be free to slide within the elongated slot 4, with the outer side walls 8' of the block member 8 sliding upon the inner side walls 4' of the elongated slot 4; while, on the other hand, when it is desired to tighten up this fourth preferred embodiment of the clamping construction according to the present invention, then the nut 14 is tightened up upon the shank portion of the bolt 5, and thereby the head portion 6 of the bolt 5 and the flange portion 7 adjacent thereto are pulled downwards in FIG. 6 against the top of the block member 8, so as, in a fashion similar to that in the first preferred embodiment of the clamping construction according to the present invention shown in FIGS. 1-3, to push the block member 8 wedgingly downwards in FIG. 6 into the elongated slot 4, and so as to push the outer side walls 8' of the block member 8 against the inner side walls 4' of the elongated slot 4 by virtue of the abovementioned inclination of the outer side walls 8' of the block member 8 and of the inner side walls 4' of the elongated slot 4, so as to wedge the block member 8 tightly and firmly into the elongated slot 4.

Further, when it is later desired to slacken off the clamping construction according to this fourth preferred embodiment of the clamping construction according to the present invention, then it is only necessary to loosen the nut 14 with respect to the shank portion of the bolt 6, either by turning the nut 14 with respect to the bolt 5, the first flange member 3, and the second flange member 12, while keeping the bolt 5 rotationally fixed with respect to the first flange member 3 and with respect to the second flange member 12, or, on the other hand, as may be desired and convenient, by keeping the nut 14 rotationally fixed with respect to the first flange member 3 and with respect to the second flange member 12, while rotating the hexagonal head portion 6 of the bolt 5 with respect to these flange members 3 and 12 and with respect to the nut 14; either of these undoing processes may be effectual and preferable, depending upon circumstances.

In this case, as in the previously described preferred embodiments, after the bolt 5 has been slackened by one of these two alternative above described procedures, then by utilization of a suitable tool such as apry bar or the like the block member 8 may be pried upwards so that its outer side walls 8' are unblocked from their wedging engagement with the inner side walls 4' of the elongated slot 4, and then the relative positions of the first flange member 3 and of the second flange member 12 may be adjusted—i.e., the rotational position of the distributor 1 with respect to the body of the internal combustion engine of the vehicle, in other words, the ignition timing of said internal combustion engine, may be adjusted.

A beneficial advantage of this fourth shown preferred embodiment of the clamping construction according to the present invention is that, as described above, the clamping construction may be tightened up, and also may be slackened off, either from the upper side thereof as seen in FIG. 6, or from the lower side thereof as seen in FIG. 6, i.e. either by tightening up of the hexagonal head portion 6 of the bolt 5 by rotating said hexagonal head portion 6 with respect to the first and second flange members 3 and 12 while keeping the nut 14 fixed, or by tightening up of the nut 14 by rotating said nut 14 with respect to the first and second flange members 3 and 12 while keeping the hexagonal head portion 6 of the bolt 5 fixed. The second above described system of tightening provides a particular benefit, in that it is not necessary for the hexagonal head portion of the bolt 5, or the flange portion 7 proximate to the hexagonal head portion 6 of the bolt 5, to be rotated with respect to the block member 8. In other words, the only mutual rotation that need be performed is that of the nut 14 with respect to the shank portion of the bolt 5 and with respect to the first flange member 3 and the second flange member 12. Thereby, the bolt 5 is pulled downwards in FIG. 6, so as to push the block member 8 into the elongated slot 4, without any rotation being caused between the bolt 5, the head portion 6 thereof, or the flanged portion 7 thereof, and the block member 8, and thus thereby rotational rubbing such as might damage the upper part of the block member 8, if the flange portion 7 of the bolt 5, for example, were to rotate while pressing hard thereagainst, is positively avoided.

Thus it is seen that the same advantages and functions are obtained with this fourth preferred embodiment of the clamping construction according to the present invention also, as with the previously described first through third preferred embodiments shown in FIGS. 1-5.

Figure 7:
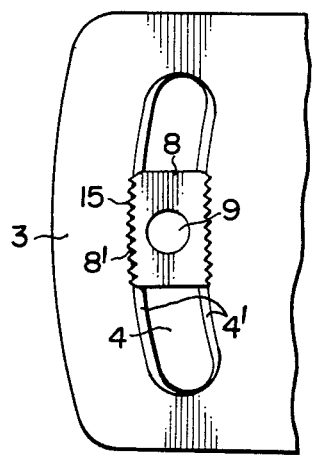
FIG. 7 is a plan view showing a portion of a fifth preferred embodiment of the clamping construction according to the present invention, in which the inner side walls of the elongated slot and also the outer side walls of the block member are all inclined with respect to the central axis of the bolt, in which the block member is formed of a substantially harder substance than are the inner side walls of the elongated slot, and in which the outer side walls of the block member are formed with serrations therein which are adapted for digging into said inner side walls of said elongated slot.

In FIG. 7, there is partially shown a sectional view taken, in a fashion similar to FIGS. 3, 4, 5, and 6, through a fifth preferred embodiment of the clamping construction according to the present invention. In FIG. 7, parts which correspond to parts of the first through fourth preferred embodiments shown in FIGS. 1-6, and which have the same functions, are designated by the same reference letters and numerals as in those figures. Further, in FIG. 7, the bolt 5 with its hexagonal head portion 6 and its flange portion 7, as well as the part 10 of the body of the internal combustion engine, are omitted for the purposes of easy viewing. These parts are in all ways similar to those in the first through third preferred embodiments shown in FIGS. 1-5, and are fitted in the same way.

In this fifth preferred embodiment of the clamping construction according to the present invention, the sloping of the outer side walls 8' of the block member 8 and of the inner side walls 4' of the elongated slot 4 is the same as in the first preferred embodiment of the clamping construction according to the present invention shown in FIGS. 1-3 and in the fourth preferred embodiment of the clamping construction according to the present invention shown in FIG. 6. That is, all of these side walls are inclined with respect to the central axis of the bolt 5. Further, the inner side walls 4' of the elongated slot 4 are formed in a smooth shape, like the inner side walls 4' of the elongated slot 4 in the first through fourth preferred embodiments of the clamping construction according to the present invention, described above and shown in FIGS. 1–6. However, the outer side walls 8' of the block member 8, in this fifth preferred embodiment of the clamping construction according to the present invention are formed, not in a smooth shape, as was the case in the previously described four embodiments, but with serrations thereon; and in particular, in this fifth preferred embodiment of the clamping construction according to the present invention, these serrations on the outer side walls 8' of the block member 8 extend in the direction roughly perpendicular to the plane of the drawing paper in FIG. 7, i.e. in the direction substantially parallel to the central axis of the shank portion of the bolt 5, of course when said bolt 5 is fitted to the clamping construction.

Apart from this serrated formation, the shape of the parts, in the construction of this fifth preferred embodiment of the clamping construction according to the present invention, is substantially the same as that of those in the first preferred embodiment of the clamping construction according to the present invention shown in FIGS. 1–3, and therefore elaborated description thereof will be omitted, in order to avoid redundancy of explanation.

Now, in this fifth preferred embodiment of the clamping construction according to the present invention, it is also the case that the block member 8 is formed of a relatively hard material, while the flange member 3 is formed of a relatively soft material; and, therefore, according to the above described particular serrated form for the outer side walls 8' of the block member 8, when the bolt 5 is tightened up so as to clamp up the clamping construction according to this fifth preferred embodiment, then, as the block member 8 is forcibly wedged into the elongated slot 4, these serrations on the outer side walls 8' of the block member 8 are forced against the smooth inner side walls 4' of the elongated slot 4, said inner side walls 4' being softer than are the high edges of the serrations. These serrations on the outer side walls 8' of the block member 8 at this time dig into the inner side walls 4' of the elongated slot 4 and produce mating and cooperating induced serrations upon the inner side walls 4' of the elongated slot 4. Thereby, the wedging action of the block member 8 into the elongated slot 4 is significantly promoted, in this fifth preferred embodiment of the clamping construction according to the present invention.

There is a particular meaning in the fact that the serrations on the outer side walls 8' of the block member 8, in this fifth preferred embodiment of the clamping construction according to the present invention, extend generally parallel to the axis of the bolt 5. Because of this, while the above described clamping up is proceeding, as the high edges of these serrations are gouging into the softer material of the inner side walls 4' of the elongated slot 4, there is not produced any tendency for the block member 8 to be displaced along the elongated slot 4. In other words, the block member 8 is squarely wedgingly forced into the elongated slot 4. On the other hand, if the serrations on the outer side walls 8' of the block member 8 were to extend obliquely to the central axis of the bolt 5, then, as the bolt 5 was tightened up, there might occur some tendency for the block member 8 to be skewed round as it was wedged into the elongated slot 4, and this might well cause the desired rotational position of the distributor 1 with respect to the body 10 of the internal combustion engine, and thereby the desired ignition timing, to be lost.

A particular advantage of this fifth preferred embodiment of the clamping construction according to the present invention, which is not present with the other preferred embodiments shown, will now be described. If, despite the difficulty of tampering with this clamping construction, after once a clamping construction according to this fifth preferred embodiment of the clamping construction according to the present invention has been tightened up, so that, as described above, the serrations on the outer side walls 8' of the block member 8 have gouged corresponding or mating serrations into the material of the inner side walls 4' of the elongated slot 4, then, if a person such as an unauthorized mechanic succeeds in readjusting the position of the block member 8 within the elongated slot 4, presumably by prying said block member 8 out of its firmly fixed in position within the elongated slot 4, then visible evidence of this tampering will remain, in the form of the above mentioned serrations induced on the inner side walls 4' of the elongated slot 4, at a position not currently corresponding to the outer side walls 8' of the block member 8. It will therefore be readily apparent to any person, such as an authorized mechanic or inspector, who looks at the parts in question, that this clamping construction according to the fifth preferred embodiment of the present invention has been readjusted. It will be noted, also, that this advantage is not present with the sixth preferred embodiment of the clamping construction according to the present invention, which will be described hereinafter.

Thus it is seen that the same advantages and functions are obtained with this fifth preferred embodiment of the clamping construction according to the present invention also, as with the previously described first through fourth preferred embodiments shown in FIGS. 1–6.

Figure 8:
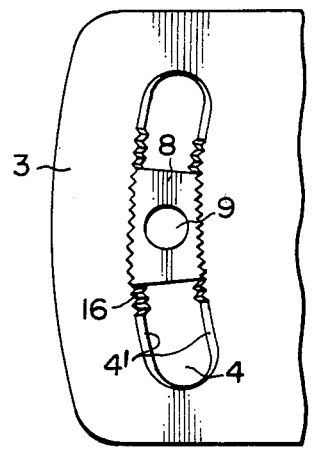
FIG. 8 is a plan view, similar to FIG. 7, showing yet a sixth preferred embodiment of the clamping construction according to the present invention, in which, in a reverse fashion to that in the fifth embodiment shown in FIG. 7, the inner side walls of the elongated slot are formed of a substantially harder substance than is the block member, and said inner side walls of said elongated slot are formed with serrations therein which are adapted for digging into said outer side walls of said block member.

In FIG. 8, there is partially shown a sectional view, taken, in a fashion similar to FIGS. 3, 4, 5, 6, and 7, through a sixth preferred embodiment of the clamping construction according to the present invention. In FIG. 8, parts which correspond to parts of the first through fifth preferred embodiments shown in FIGS. 1–7, and which have the same functions, are designated by the same reference letters and numerals as in those figures. Further, in FIG. 8, as in FIG. 7, the bolt 5 with its hexagonal head portion 6 and its flange portion 7, as well as the part 10 of the body of the internal combustion engine, are omitted for the purposes of easy viewing. Again, these parts are in all ways similar to those in the first through the third preferred embodiments shown in FIGS. 1–5, and are fitted in the same way.

In this sixth preferred embodiment of the clamping construction according to the present invention, the sloping of the outer side walls 8' of the block member 8 and of the inner side walls 4' of the elongated slot 4 is the same as in the first preferred embodiment of the clamping construction according to the present invention shown in FIGS. 1–3 and in the fourth and fifth preferred embodiments of the clamping construction according to the present invention shown in FIGS. 6 and 7. That is, all of these side walls are inclined with respect to the central axis of the bolt 5. Further, the outer side walls 8' of the block member 8 are formed in a smooth shape, like the outer side walls 8' of the block member 8 in the first through fourth preferred embodiments of the clamping construction according to the present invention, described above and shown in FIGS.

1-6. However, the inner side walls 4' of the elongated slot 4, in this fifth preferred embodiment of the clamping construction according to the present invention are formed, not in a smooth shape as was the case in the first through fourth previously described embodiments, but with serrations thereon; and in particular, in this sixth preferred embodiment of the clamping construction according to the present invention, these serrations on the inner side walls 4' of the elongated slot 4 extend in the direction roughly perpendicular to the plane of the drawing paper in FIG. 7, i.e. in the direction substantially parallel to the central axis of the shank portion of the bolt 5, of course when said bolt 5 is fitted to the clamping construction.

Apart from this serrated formation, the shape of the parts, in the construction of this fifth preferred embodiment of the clamping construction according to the present invention, is substantially the same as that of those in the first preferred embodiment of the clamping construction according to the present invention shown in FIGS. 1-3, and therefore elaborated description thereof will be omitted, in order to avoid redundancy of explanation.

Now, in this fifth preferred embodiment of the clamping construction according to the present invention, it is also the case that the flange member 3 is formed of a relatively hard material, while the block member 8 is formed of a relatively soft material; and, therefore, according to the above described particular serrated form for the inner side walls 4' of the elongated slot 4, when the bolt 5 is tightened up so as to clamp up the clamping construction according to this fifth preferred embodiment, then, as the block member 8 is forcibly wedged into the elongated slot 4, these serrations on the inner side walls 4' of the elongated slot 4 are forced against the smooth outer side walls 8' of the block member 8, said smooth outer side walls 8' being softer than are the high edges of said serrations. These serrations on the inner side walls 4' of the elongated slot 4 at this time dig into the outer side walls 8' of the block member 8 and produce mating and cooperating induced serrations upon these outer side walls 8' of the block member 8. Thereby, the wedging action of the block member 8 into the elongated slot 4 is significantly promoted, in this sixth preferred embodiment of the clamping construction according to the present invention.

It should be noted that in FIG. 8 a partial view of the clamping construction according to the sixth preferred embodiment of the present invention is shown, in which the clamping construction has already once been tightened up, and in which, therefore, the above described so called induced serrations on the outer side walls 8' of the block member 8 have already been produced, in the fashion described above.

There is, again, a particular meaning in the fact that the serrations on the inner side walls 4' of the elongated slot 4, in this sixth preferred embodiment of the clamping construction according to the present invention, extend generally parallel to the axis of the bolt 5. Because of this, while the above described clamping up is proceeding, as the high edges of these serrations are gouging into the softer material of the outer side walls 8' of the block member 8, there is not produced any tendency for the block member 8 to be displaced along the elongated slot 4. In other words, the block member 8 is squarely wedgingly forced into the elongated slot 4. On the other hand, if the serrations on the inner side walls 4' of the elongated slot 4 were to extend obliquely to the central axis of the bolt 5, then, as the bolt 5 was tightened up, there might occur some tendency for the block member 8 to be skewed round as it was wedged into the elongated slot 4, and this might well cause the desired rotational position of the distributor 1 with respect to the body 10 of the internal combustion engine, and thereby the desired ignition timing, to be lost.

Thus it is seen that the same advantages and functions are obtained with this sixth preferred embodiment of the clamping construction according to the present invention also, as with the other five preferred embodiments shown in FIGS. 1-7.

As previously mentioned, the clamping construction according to the present invention can be utilized in a variety of mechanical constructions, and should not be considered as limited merely to use for clamping the fixing angle of a distributor to an internal combustion engine. Further, other variations of the present invention are possible; for example, the surfaces of contact formed on the two members which are to be clamped together need not be plane surfaces, although in the shown embodiments they have been plane surfaces. Many other sorts of variation of the present invention may be conceived of. Therefore, although the present invention has been shown and described with reference to several preferred embodiments thereof, and in terms of the illustrative drawings, it should not be considered as limited thereby. It should be understood that various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

I claim:

1. A construction for clamping together:
    (a) a first member, formed with a first plane contact surface to which opens a cylindrical bolt hole formed in said first member to be perpendicular to said first plane contact surface, and
    (b) a second member formed with a second plane contact surface and an elongated slot which is of the general form of a circular arc and is defined by two opposing inner side walls extending along said second plane contact surface, said elongated slot opening from said second plane contact surface to the side of said second member remote from said second plane contact surface;
    (c) contact together of said first member and of said second member being possible in any one of a range of relative positions, with said first plane contact surface of said first member opposing and contacting said second plane contact surface of said second member and with the open end of said bolt hole opposing said elongated slot, comprising:
    (d) a bolt comprising a head portion and a shank portion connected with said head portion at one end thereof and having a threaded free end portion at the other end thereof, said shank portion of said bolt passing through said elongated slot;
    (e) a block member, located at least partly within said elongated slot, formed with a cylindrical through hole through which said shank portion of said bolt passes as closely fitted with no substantial clearance left therebetween, said bolt exerting pressure on a part of said block member remote from said first member so as to urge said block member along the central axis of said bolt in the direction towards said first member when said bolt is tightened towards said first member by the threaded free end portion of the shank portion thereof being either directly screwed into said bolt hole of said first member or threadly engaged by a nut therearound and supported by said first member, said block member being formed with two outer side walls and being positioned with respect to said elongated slot so that said two outer side walls extend generally along the length of said elongated slot, each of said two outer side walls opposing and being in contact with a corresponding inner side wall of said elongated slot;

(f) atleast one of said four side walls being inclined with respect to said central axis of said bolt, so that the part of said inclined side wall which is closer to said first member is closer to said central axis of said bolt than is the part of said inclined side wall which is further from said first member;

(g) the thickness and the profile of said block member in the section across said elongated slot, and the width and the profile of said elongated slot in the section across said elongated slot, being such that without deformation of said block member or of said second member, it is not possible to displace said block member through said elongated slot along the central axis of said bolt in the direction towards said first member so far as to allow said block member to come into contact with said first member;

(h) the tightening up of said bolt wedgingly urging said block member towards said first member and into said elongated slot and forcing said two outer side walls of said block member each against its corresponding inner side wall of said elongated slot;

(i) whereby, when said bolt is tightened up, said second member is urged against said first member with said second plane contact surface of said second member; and the engagement of said two outer side walls of said block member against their corresponding inner side walls of said elongated slot, the engagement of said shank of said bolt with said cylindrical through hole in said block member, and the engagement of said shank of said bolt with said first member through said bolt hole formed therein fixing said second member with respect to said first member, so that said second plane contact surface is prevented from sliding upon said first plane contact surface, while, when said bolt is loosened, said second member is free to move with respect to said first member in a rotational fashion about a central axis which is the central axis of said arc which is substantially perpendicular to said first and second plane contact surfaces of said said first and second members, respectively, in sliding contact with each other.

2. A construction for clamping according to claim 1, wherein each of said four side walls is inclined with respect to said central axis of said bolt, so that its part which is closer to said first member is closer to said central axis of said bolt than is its part which is further from said first member; whereby said wedging effect of said block member into said elongated slot is obtained.

3. A construction for clamping according to claim 2, wherein each of said outer side walls of said block member is inclined at substantially the same angle to said central axis of said bolt, as is the corresponding inner side wall of said elongated slot; whereby close mutual contact between said outer side walls of said block member and said inner side walls of said elongated slot may be obtained, over major portions of the surfaces of said outer side walls of said block member, and over major portions of the extent of the contact surfaces of said inner side walls of said elongated slot in the direction of said central axis of said bolt.

4. A construction for clamping according to claim 3, wherein each of said two outer side walls of said block member is inclined at substantially the same angle to said central axis of said bolt; whereby, as said block member is wedgingly urged into said elongated slot, no particular tendency is caused for said block member to tilt relative to said second member.

5. A construction for clamping according to claim 1, wherein both of said two outer side walls of said block member are inclined with respect to said central axis of said bolt, so that their parts which are closer to said first member are closer to said central axis of said bolt than are their parts which are further from said first member, and wherein said two inner side walls of said elongated slot in said second member extend generally parallel to said central axis of said bolt and are not inclined with respect thereto; whereby said wedging effect of said block member into said elongated slot is obtained, and whereby the contact between said outer side walls of said block member and said inner side walls of said elongated slot occurs generally at the side of said second member remote from said first member.

6. A construction for clamping according to claim 1, wherein both of said two inner side walls of said elongated slot are inclined with respect to said central axis of said bolt, so that their parts which are closer to said first member are closer to said central axis of said bolt than are their parts which are further from said first member, and wherein said two outer side walls of said block member extend generally parallel to said central axis of said bolt and are not inclined with respect thereto; whereby said wedging effect of said block member into said elongated slot is obtained, and whereby the contact between said outer side walls of said block member and said inner side walls of said elongated slot occurs generally at the portion of said block member closer to said first member.

7. A construction for clamping according to any one of claims 2-6 or 1, wherein said block member and said second member are formed of substantially the same material; whereby, after the clamping construction is left clamped up for a substantial time, a tendency to frictional welding of the outer side walls of said block member to the inner side walls of said elongated slot may occur, whereby wedging of said block member into said elongated slot is advantageously promoted.

8. A construction for clamping according to claim 7, wherein said material of said block member and said second member is susceptible to frictional welding.

9. A construction for clamping according to any one of claims 2-6 or 1, wherein one member of said block member and said second member is formed of a relatively hard material, and said side walls of said one member are formed with serrations thereon; and further wherein the other member of said block member and said second member is formed of a relatively soft material, and said side walls of said other member are relatively smooth; whereby, when said bolt is tightened up so as to tighten up said clamping construction, said serrations on the side walls of said one member may dig into the side walls of said other member and engage well therewith, whereby engagement together of said block member and said second member is advantageously promoted.

10. A construction for clamping according to any one of claims 2-6 or 1, wherein said block member is formed of a relatively hard material, and said two outer side walls of said block member are formed with serrations thereon; and further wherein said second member is formed of a relatively soft material, and said two inner side walls of said elongated slot are formed as relatively smooth; whereby, when said bolt is tightened up so as to tighten up said clamping construction, said serrations on the side walls of said block member may dig into the side walls of said second member and engage well therewith, whereby engagement together of said block member and said second member is advantageously promoted.

11. A construction for clamping according to any one of claims 2-6 or 1, wherein said second member is formed of a relatively hard material, and said two inner side walls of said elongated slot are formed with serrations thereon; and further wherein said block member is formed of a relatively soft material, and said two outer side walls of said block member are formed as relatively smooth; whereby, when said bolt is tightened up so as to tighten up said clamping construction, said serrations on the side walls of said elongated slot may dig into the side walls of said block member and engage well therewith, whereby engagement together of said block member and said second member is advantageously promoted.

12. A construction for clamping according to claim 10, wherein said serrations extend generally substantially parallel to said shank portion of said bolt-nut assembly; whereby, when said bolt is tightened up and said block member is wedgingly urged into said elongated slot, no tendency is caused for said block member to skew within said elongated slot.

13. A construction for clamping according to claim 11, wherein said serrations extend generally substantially parallel to said shank portion of said bolt-nut assembly; whereby, when said bolt is tightened up and said block member is wedgingly urged into said elongated slot, no tendency is caused for said block member to skew within said elongated slot.

* * * * *